United States Patent
Yokoi et al.

(10) Patent No.: US 7,202,480 B2
(45) Date of Patent: Apr. 10, 2007

(54) SEMICONDUCTOR RADIOLOGICAL DETECTOR AND SEMICONDUCTOR RADIOLOGICAL IMAGING APPARATUS

(75) Inventors: Kazuma Yokoi, Hitachi (JP); Hiroshi Kitaguchi, Naka (JP); Takafumi Ishitsu, Hitachi (JP); Kensuke Amemiya, Hitachinaka (JP); Yuuichirou Ueno, Hitachi (JP); Katsutoshi Tsuchiya, Hitachi (JP); Norihito Yanagita, Hitachi (JP); Shinichi Kojima, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 168 days.

(21) Appl. No.: 10/950,652

(22) Filed: Sep. 28, 2004

(65) Prior Publication Data

US 2005/0067574 A1    Mar. 31, 2005

(30) Foreign Application Priority Data

Sep. 30, 2003   (JP)  ............................. 2003-342685

(51) Int. Cl.
*G01T 1/24* (2006.01)

(52) U.S. Cl. ........................... 250/370.01; 250/370.08; 250/394

(58) Field of Classification Search ........... 250/370.01, 250/370.06, 370.08, 370.09, 370.11, 363.05, 250/385.1, 394; 257/E27.146
See application file for complete search history.

(56) References Cited

U.S. PATENT DOCUMENTS

| | | | | |
|---|---|---|---|---|
| 4,734,623 A | * | 3/1988 | Ohkoshi et al. | 315/169.4 |
| 4,879,464 A | * | 11/1989 | Iinuma | 250/361 R |
| 5,721,422 A | * | 2/1998 | Bird | 250/208.1 |
| 5,905,264 A | * | 5/1999 | Shahar et al. | 250/370.01 |
| 5,907,156 A | * | 5/1999 | Nishizawa et al. | 250/370.01 |
| 6,069,362 A | * | 5/2000 | Giakos | 250/394 |
| 6,404,852 B1 | * | 6/2002 | Petrick et al. | 378/98.8 |
| 6,423,974 B1 | * | 7/2002 | Ishikawa et al. | 250/370.14 |
| 6,590,611 B1 | * | 7/2003 | Ishida et al. | 348/310 |
| 6,621,084 B1 | * | 9/2003 | Wainer et al. | 250/370.09 |
| 2003/0128812 A1 | * | 7/2003 | Appleby et al. | 378/147 |

OTHER PUBLICATIONS

Radiation Detection and Measurement, 3rd Edition, Nikkan Kogyo Shinbun, Ltd., pp. 559-560.
"Lighter and More Compact 3-D MID for Electronic Equipments" by Komagine et al., Hitachi Densen No. 20 (Jan. 2001), pp. 69-74.

* cited by examiner

*Primary Examiner*—David Porta
*Assistant Examiner*—Faye Boosalis
(74) *Attorney, Agent, or Firm*—Dickstein Shapiro LLP

(57) ABSTRACT

The semiconductor radiological detector 1 minimizes a dead space resulting from the draw-out of a signal line from an electrode and which allows a number of semiconductor devices to be densely arranged to improve sensitivity and spatial resolution. The semiconductor radiological detector 1 comprises a semiconductor device 2, an anode 3 attached to one surface of the semiconductor device 2, and a cathode 4 attached to the other surface of the semiconductor device 2. A signal line 5 is provided on the anode 3; the signal line 5 extends straight from the anode 3 and is connected to an X axis wire 12. Another signal line 13 is provided on the cathode 4; the signal line 13 extends straight from the cathode 4 and is connected to a Y axis wire 14.

16 Claims, 10 Drawing Sheets

SEMICONDUCTOR RADIOLOGICAL DETECTOR AND SEMICONDUCTOR RADIOLOGICAL IMAGING APPARATUS

BACKGROUND OF THE INVENTION

The present invention relates to a semiconductor radiological detector, and in particular, to a semiconductor radiological detector and a semiconductor radiological detecting apparatus which are suitably used in a two- or three-dimensional imaging apparatus.

A cross strip type radiological detector 100 shown in FIG. 10 is conventionally known as a semiconductor radiological detector (for example, Radiation Detection and Measurement, 3rd Edition (NIKKAN KOGYO SHINBUN LTD.), PP. 559–560). With a method of reading detection information (cross strip type reading method) which method is used in the cross strip type radiological detector 100 (hereinafter referred to as a semiconductor radiological detector 100), the position at which radioactive rays are incident is determined on the basis of as an X axis detected position and a Y axis detected position using a semiconductor device 101 composed of, for example, a cadmium telluride (CdTe) or the like to generate charges when irradiated with radioactive rays, a plurality of X axis strip electrodes (anodes) 102 extending so as to cross at right angles, and a plurality of Y axis strip electrodes (cathodes) 103. Then, two-dimensional incident position information is obtained by simultaneous measurements.

Accordingly, for example, for n×n pixels, the number of channels for individual reading is the same as the number of pixels (n×n). In contrast, with the cross strip type reading method, the number of reading channels is only 2×n, thus enabling the number of reading electrodes to be reduced (see, for example, Radiation Detection and Measurement, 3rd Edition (NIKKAN KOGYO SHINBUN LTD.), PP. 559–560). Specifically, if for example, the number of pixels on one side is 200, 200×200=40,000 reading channels are normally required. However, with the cross strip reading method, only 2×200 reading channels are required. That is, with the cross strip type reading method, the number of reading channels (the number of circuits) is 2×200/(200× 200)=1/100. Therefore, the number of reading channels can be sharply reduced.

If the semiconductor radiological detectors 100, 100, described in Radiation Detection and Measurement, 3rd Edition (NIKKAN KOGYO SHINBUN LTD.), PP. 559–560, are arranged in parallel to increase the area of the detection surface, when a reading circuit is placed on a y ray incident side, the reading circuit may be an obstacle. Accordingly, a y ray incident side signal line must be drawn to a reading circuit located opposite the y ray incident side. To draw out signal lines 105 from the X axis strip electrode 102 to a Y axis wire 104, it is necessary to insulate the signal lines 105 so that the Y axis strip electrode 103 will not electrically contact with the signal lines 105. Thus, to draw out the signal lines 105 from the X axis strip electrode 102, the signal lines 105 must be bent like a circular arc, when connected to the Y axis wire 104, so as to run away from the Y axis strip electrode 102. As a result, as shown in FIG. 10, a dead space of size d for the signal lines 105 must be provided around the semiconductor radiological detector 100. This prevents a number of semiconductor radiological detectors 100 from being densely arranged. Thus, disadvantageously, the sensitivity, spatial resolution, and the like of the semiconductor radiological detector decrease, resulting in nonuniformity at joints.

SUMMARY OF THE INVENTION

It is an object of the present invention to provide a semiconductor radiological detector and a semiconductor radiological detecting apparatus which minimizes a dead space resulting from the draw-out of a signal line from an electrode and which allows semiconductor elements to be densely arranged to improve sensitivity and spatial resolution.

To accomplish this object, the present invention is configured as described below. A semiconductor radiological detector comprising a semiconductor device, an anode attached to one surface of the semiconductor device, a cathode attached to the other surface of the semiconductor device, and a signal line one end of which is connected to at least one of the anode and cathode and the other end of which extends straight from the one of the anode and cathode to output a signal from the one of the anode and cathode.

This configuration allows the signal lines to be extended straight from the electrode (anode or cathode) to prevent a dead space for the signal lines from being created around the semiconductor radiological detector.

The present invention enables the signal line to be extended straight along a surface of the electrode (anode or cathode) to prevent the dead space for the signal lines from being created around the semiconductor radiological detector. This enables a number of semiconductor radiological detectors to be densely arranged. Therefore, detection sensitivity is improved and nonuniformity at joints can be avoided.

Other objects, features and advantages of the invention will become apparent from the following description of the embodiments of the invention taken in conjunction with the accompanying drawings.

DESCRIPTION OF THE INVENTION

First Embodiment

A first embodiment of the present invention will be described below with reference to FIGS. 1 and 2, which are accompanying drawings.

Figure 1:
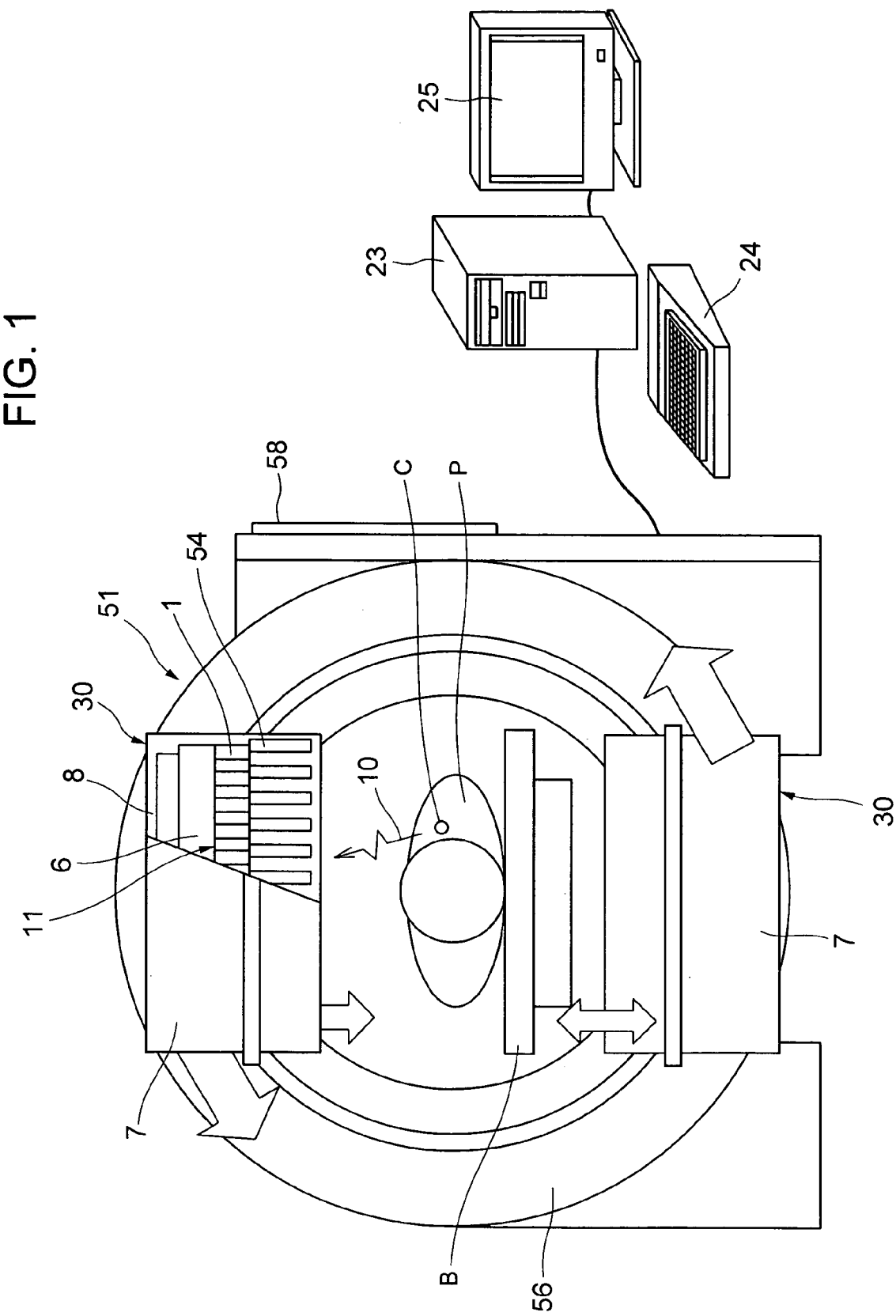
FIG. 1 is a view showing a whole SPECT apparatus according to a first embodiment of the present invention.

In FIG. 1, a SPECT (Single Photon Emission Computer Tomography) apparatus 51 that is a radiological imaging apparatus comprises paired semiconductor radiological detecting apparatuses 30, a rotating support table 56, a data collecting and analyzing apparatus 23, a data input apparatus 24, and a display apparatus 25. Paired semiconductor radiological detecting apparatuses 30 are arranged on the rotating support table 56 at an angle of 180° to each other in a circumferential direction. Specifically, socket board mounting substrates 6 of the semiconductor radiological detecting apparatuses 30 are mounted on the rotating support table 56 at an angle of 180° to each other in the circumferential direction. Each radiological detecting unit 11 faces a bed B. A collimator 54 is installed between the radiological detecting unit 11 and a patient P to limit a view angle from the radiological detecting unit 11. A measuring circuit unit 8 is installed in the socket board mounting substrate 6. The radiological detecting unit 11, the collimator 54, and the measuring circuit unit 8 are housed in a shading electromagnetic shield 7 to block the adverse effect of electromagnetic waves other than gamma rays 10.

The bed B is moved on which the patient P to whom radiopharmaceuticals has been administered is lying. The patient P is thus moved to between the paired socket boards 6. The gamma rays 10 emitted from a collected part C in the patient in which the radiopharmaceuticals are collected are incident on a semiconductor radiological detector 1 in each radiological detecting unit 11 through a through-hole portion in the collimator 4. A gamma ray detection signal outputted by the semiconductor radiological detector 1 is processed by the measuring circuit unit 8. The data collecting and analyzing apparatus 23 uses information outputted by the measuring circuit unit 8 to create image information on the patient P. The image information is then displayed on the display apparatus 25. The rotating support table 56 is rotated to pivot each socket board 6 and each radiological detecting unit 11 around the patient P. During pivoting, the radiological detecting unit 11 outputs a gamma ray detection signal. The rotation of the rotating support table 56, the distance between the radiological detecting unit 11 and the patient P, and the position of the patient P on the bed B can be controlled near the SPECT apparatus 51 using an operation panel 58 or remotely using the data input apparatus 24.

Now, description will be given of the plurality of semiconductor radiological detectors 1, 1, . . . , constituting the radiological detecting unit 11, used in the present embodiment.

Figure 2:
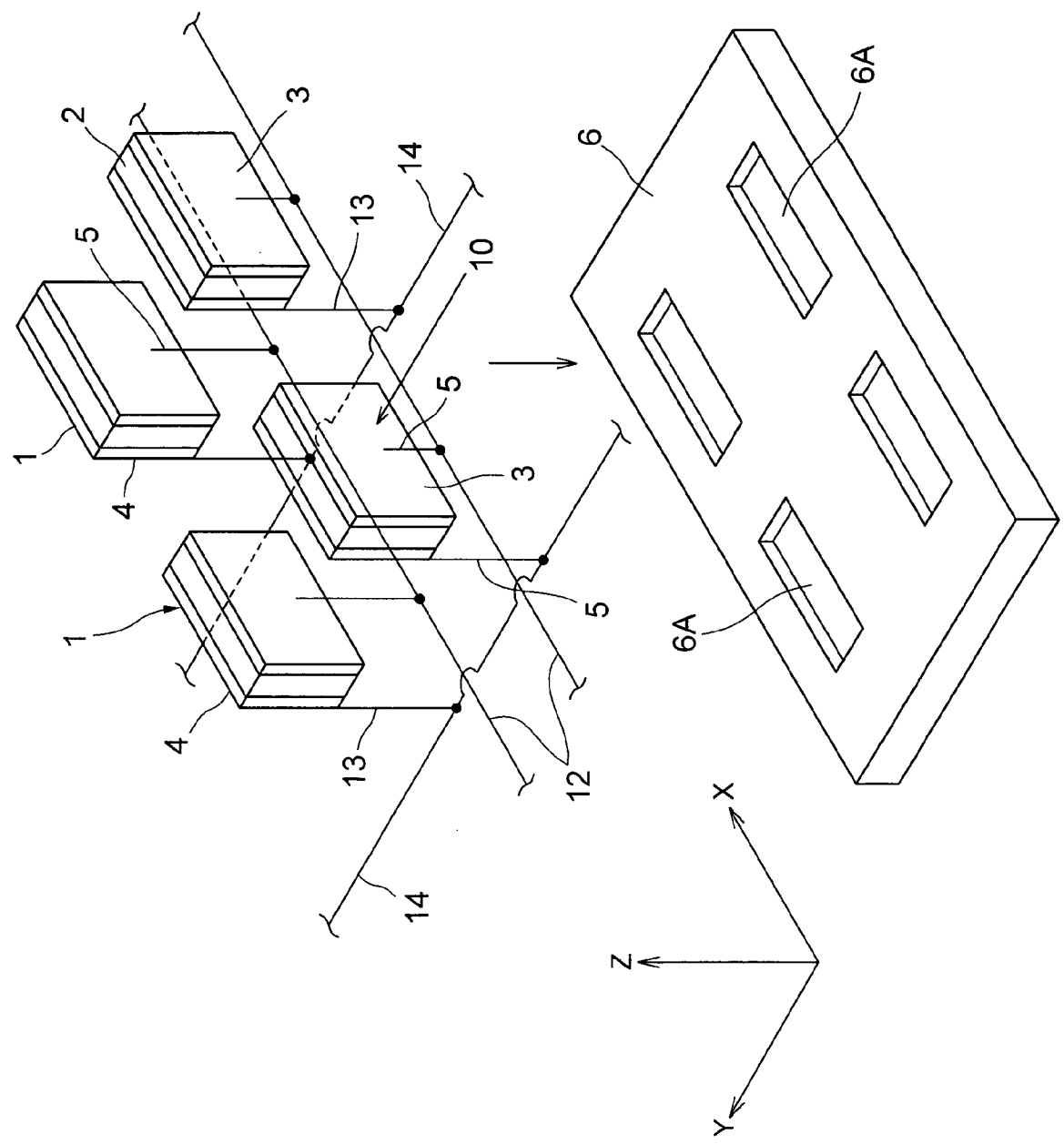
FIG. 2 is an exploded perspective view showing a radiological detecting unit in FIG. 1.

As shown in FIG. 2, the semiconductor radiological detector 1 is composed of a semiconductor device 2 consisting of cadmium telluride (CdTe) to generate charges when irradiated with radioactive rays, an anode 3 formed on one surface of the semiconductor device 2 by deposition or any other method, and a cathode 4 formed on the other surface of the semiconductor device 2.

In this case, a signal line 5 is provided on the anode 3 of the semiconductor radiological detector 1; the signal line 5 extends straight from a surface of the anode 3 in a Z direction in FIG. 2 (a vertical direction in FIG. 2), with one end of the signal line 5 connected to the surface of the anode 3. The other end of the signal line 5 is connected to the middle of a corresponding one of a number of X axis wires 12 extending parallel to one another along the direction of an X axis. Signal lines connected to anodes 3 with the same Y coordinate are connected to the same X axis wire 12.

Further, another signal line 13 is provided on the cathode 4 of the semiconductor radiological detector 1; the signal line 13 extends straight along a surface of the cathode 4 in the Z direction in FIG. 2 (the vertical direction in FIG. 2), with one end of the signal line 13 connected to the surface of the cathode 4. The other end of the signal line 13 is connected to the middle of a corresponding one of a number of Y axis wires 14 extending parallel to one another along the direction of a Y axis. Signal lines connected to cathode 4 with the same X coordinate are connected to the same Y axis wire 14. The semiconductor radiological detectors 1 are fitted in respective concave grooves 6A, 6A, . . . formed in the socket board mounting substrate 6.

Now, description will be given of operations of the radiological detecting unit 11 configured as described above.

The semiconductor device 2, shown in FIG. 2, is composed of an element that is likely to interact with the gamma rays 10. However, radioactive rays such as gamma rays 10 which have high energy are likely to penetrate through the semiconductor device 2 before interaction occurs. However, in the radiological detecting unit 11 according to the first embodiment, the plurality of semiconductor radiological detectors 1 are arranged parallel to one another in the direction of a Z axis so as to form a sufficient gamma ray penetration thickness. Further, when the gamma rays 10 interact with the semiconductor device 2, charges (holes/electrons) are generated. However, in the semiconductor detecting unit 11 according to the present embodiment, the distance between the electrodes (the distance between the anode 3 and the cathode 4) in the semiconductor radiological detector 1 is short. Consequently, charges generated can be appropriately captured. That is, in the configuration shown in FIG. 2, if the gamma rays 10 are incident and interact with the semiconductor device 2, information based on charges is obtained from the X axis wire 12 and Y axis wire 14 that are close to a position where the gamma rays 10 have interacted with the semiconductor device 2. In the example shown in FIG. 2, signals are obtained from the rightmost one of the X axis wires 12 and from the second electrode from the bottom end of each Y axis wire 14. These signals are can be simultaneously determined and superimposed on each other to detect with which semiconductor device 2 the gamma rays 10 have interacted, that is, where the gamma rays 10 have been incident in the semiconductor radiological detector 1. In this example, the incident position of the gamma rays is detected as the position of the rightmost and second semiconductor radiological detector 1 from the bottom. That is, Y coordinate information is obtained from the wires parallel to the X axis. X coordinate information is obtained from the wires parallel to the Y axis.

Thus, even if the detectors are configured by individually arranging elements, the number of circuits required is sharply reduced to 2/n compared to the case in which data is individually read from n×n pixels, by carrying out X and Y reading similar to that in the cross strip type detector.

In the present embodiment, configured as described above, the signal lines 5 and 13 can be extended straight along the surfaces of the anode 3 and cathode 4, respectively. This prevents a dead space for the signal lines from being created around the semiconductor radiological detector 1 as described in the prior art. Therefore, a plurality of semiconductor radiological detectors 1 can be densely installed to improve the detection sensitivity and spatial resolution of the semiconductor radiological detectors 1.

Second Embodiment

Now, with reference to FIG. 3, description will be given of a second embodiment of the present invention.

Figure 3:
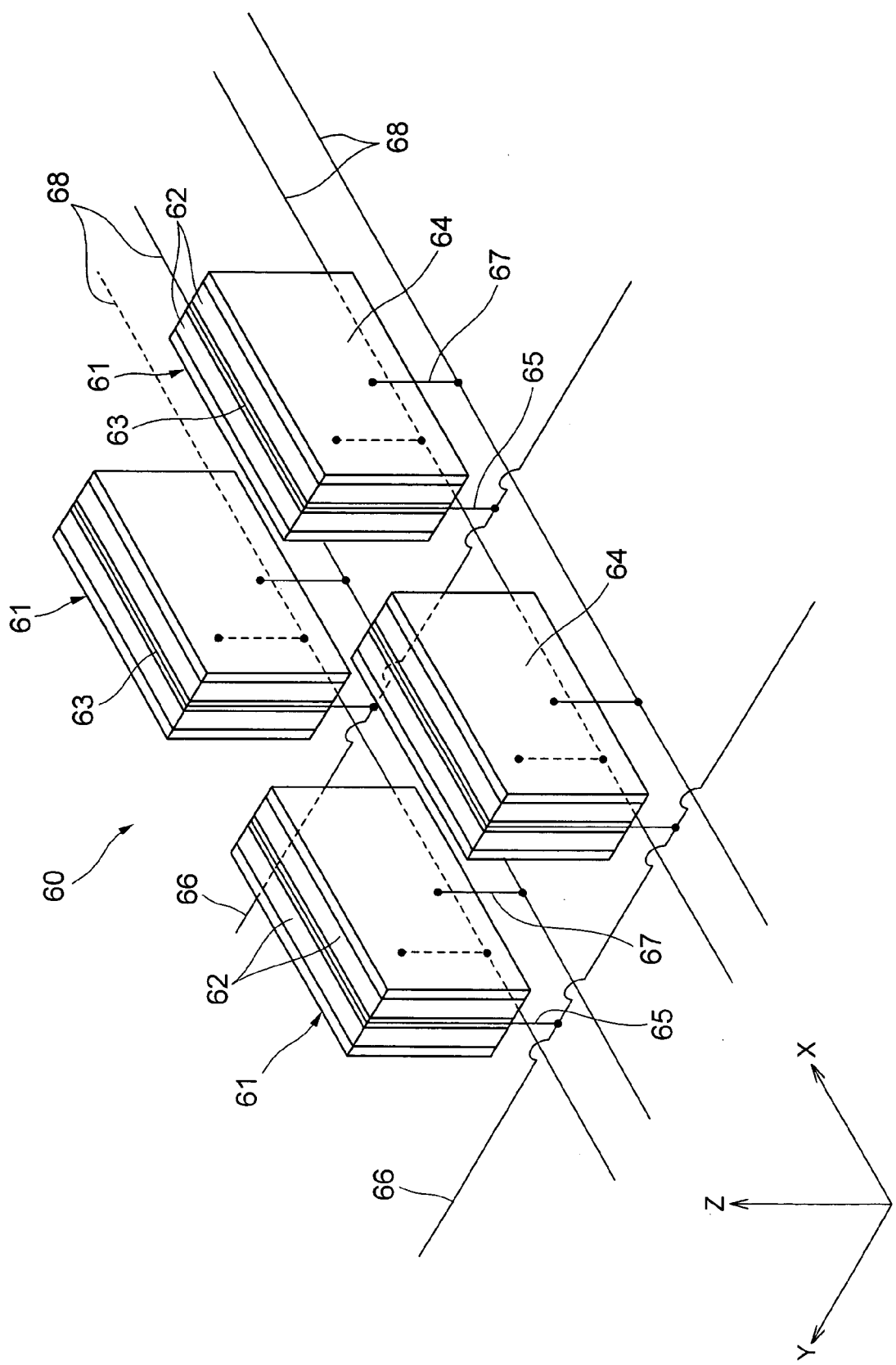
FIG. 3 is a perspective view showing a radiological detecting unit according to a second embodiment of the present invention.

In FIG. 3, a radiological detecting unit 60 comprises a plurality of semiconductor radiological detectors 61, 61, . . . (only four are shown) as in the case of the first embodiment. That is, if the thickness of a single semiconductor device 61 is simply increased, the distance between electrodes, in other words, a charge collection distance increases to reduce the energy resolution. However, in the present embodiment, a plurality of semiconductor radiological detectors 1 are arranged parallel to one another with the inter-electrode distance of a single device reduced. This provides a semiconductor radiological detector 1 having both high energy resolution and high detection efficiency. The semiconductor radiological detector 61 has two semiconductor devices 62, 62 arranged opposite each other, anodes 63, 63 placed between the semiconductor devices 62 and 62, and cathodes 64, 64 placed opposite the anodes 63 via the semiconductor device 62, respectively.

A signal line 65 is provided on the anodes 63 of the semiconductor radiological detector 61; the signal line 65 extends straight from the anodes 63 downward and in the Z direction in FIG. 3 (the vertical direction in FIG. 3) toward the mounting substrate. The signal line 65 is connected to the middle of a corresponding one of a number of Y axis wires 66 extending parallel to one another along the direction of the Y axis.

Further, another signal line 67 is provided on the cathode 64 of the semiconductor radiological detector 61; the signal line 67 extends straight along a surface of the cathode 64 in the Z direction in FIG. 3 (the vertical direction in FIG. 3), with one end of the signal line 67 connected to the surface of the cathode 64. The other end of the signal line 67 is connected to the middle of a corresponding one of a number of X axis wires 68 extending parallel to one another along the direction of the X axis. The semiconductor radiological detectors 61 are fitted in respective concave grooves (none of them are shown) formed in the socket board mounting substrate as in the case of the first embodiment.

Also in the present embodiment, configured as described above, the anode 63 is connected to the Y axis wire 66 via the signal line 65, while the cathode 64 is connected to the X axis wire 68 via the signal line 67. Accordingly, the signal lines 65 and 67 can be extended straight along the surfaces of the anode 63 and cathode 64, respectively. This prevents a dead space for the signal lines from being created around the semiconductor radiological detector 61 as described in the prior art. Therefore, a plurality of semiconductor radiological detectors 61 can be densely installed to improve the detection sensitivity and spatial resolution of the semiconductor radiological detectors 61.

Third Embodiment

Now, a third embodiment of the present invention will be described with reference to FIGS. 4 and 7.

Figure 4:
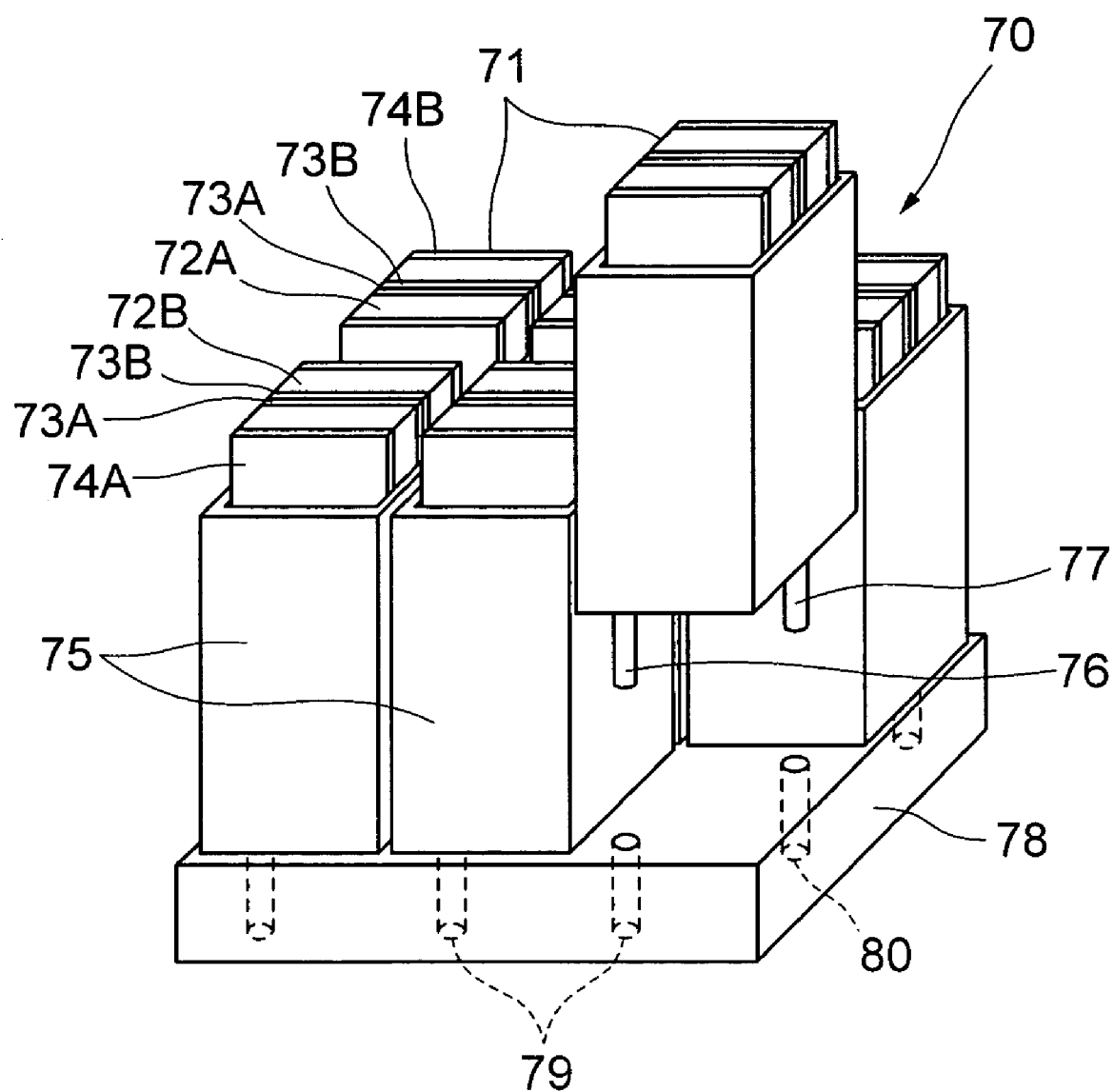
FIG. 4 is a perspective view showing a radiological detecting unit according to a third embodiment of the present invention.

In FIG. 4, a radiological detecting unit 70 comprises a plurality of semiconductor radiological detectors 71, 71, . . . (only six of them are shown). The semiconductor radiological detector 71 is composed of two semiconductor devices 72A and 72B arranged opposite each other, anodes 73A and 73B placed between the semiconductor devices 72A and 72B, cathodes 74A and 74B placed opposite the anodes 73A and 73B via the semiconductor devices 72A and 72B, respectively, and a protective connector case 75 that accommodates the semiconductor devices 72A and 72B, the cathodes 73A and 73B, and the anodes 74A and 74B. A bottom part of the protective connector case 75 is provided with a cathode pin 76 that is a signal line connected to the cathodes 73A and 73B and an anode pin 77 that is another signal line connected to the anodes 74A and 74B. Further, a socket board 78 is formed with a cathode pin hole 79 and an anode pin hole 80 into which the cathode pin 76 and the anode pin 77 are inserted respectively.

Figure 5:
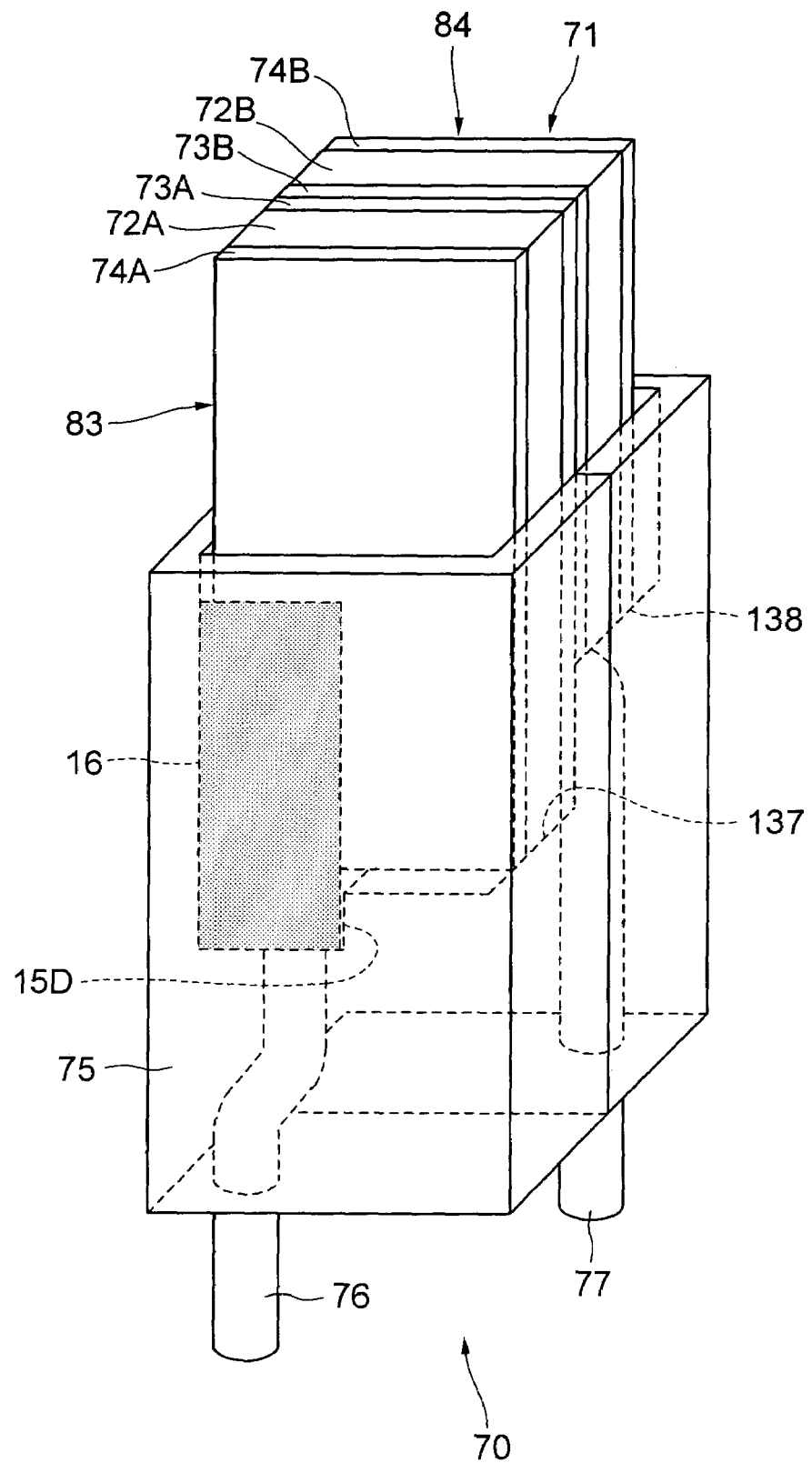
FIG. 5 is a perspective view showing a single semiconductor radiological detector in FIG. 4.
Figure 6:
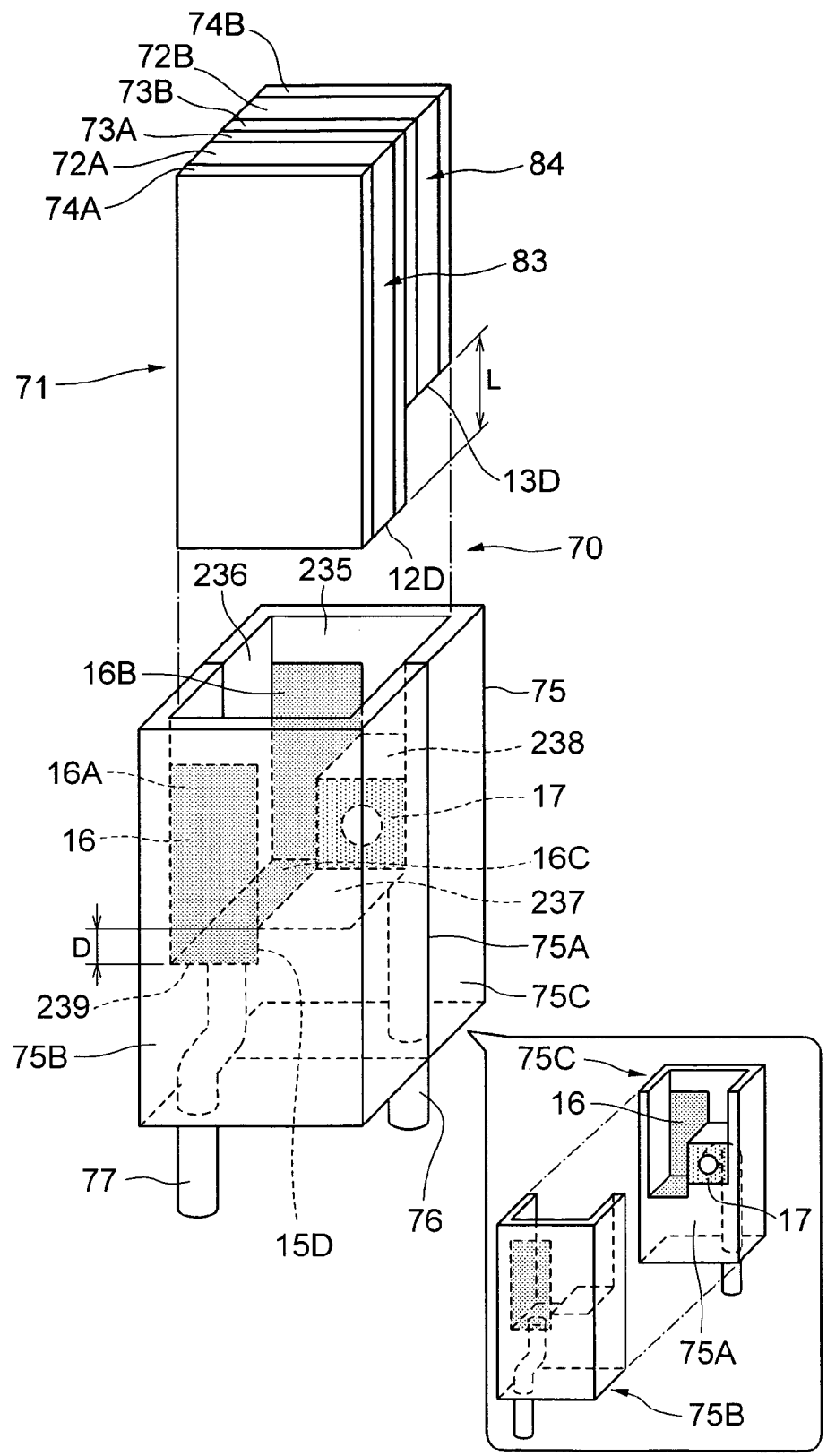
FIG. 6 is an exploded perspective view showing the semiconductor radiological detector in FIG. 5.

As shown in FIGS. 5 and 6, a detector element 83 comprises the semiconductor device 72A, the cathode 73A, and the anode 74A. The detector element 83 is formed to be longer by a dimension L (see FIG. 6) than a detector element 84 comprising the semiconductor device 72B, the cathode 73B, and the anode 74B. Specifically, one end surface of the semiconductor device 72A projects from one end surface of the semiconductor device 72B in a longitudinal direction of the semiconductor device 72A. Thus, in the semiconductor radiological detector 71, of the anodes 74A and 74B, places between the adjacent semiconductor devices 72A and 72B, the anode 74A, provided in the longer semiconductor device 72A, partly projects outward from one end of the shorter semiconductor device 72A. That is, the anode 74A is partly exposed.

As shown in FIG. 6, the protective connector case 75 is composed of, for example, a resin material that is an electric insulating material. The protective connector case 75 is formed like a box having a space 235 connected to an opening 236 formed at one end. An upper end of the space 235 is closed. The protective connector case 75 is formed by securing two case elements 75B and 75C to each other which have a substantially convex parting surface 75A. Here, preferably, the resin material used for the protective connector case 75 has a density set at 4 g/cm$^3$ or less and the constituent element of the protective connector case 75 has an atomic number set at about 10 or less. This is to reduce the probability of reaction based on the photoelectric effect between the gamma rays 10 and the protective connector case 75, shown in FIG. 7, and to suppress a decrease in the sensitivity of the semiconductor radiological detector 71 which decrease occurs when the protective connector case 75 acts as an obstacle. The probability of the reaction based on the photoelectric effect is proportional to the first power of the density of the photoelectric connector case 75 and to the fourth to fifth power of the atomic number.

The space 235 in the protective connector case 75 is surrounded by four inner sides of the protective connector case 75. The following are inserted into the space 235 through an opening 236: a detector element 83 consisting of the semiconductor device 72A, the cathode 73A, and the anode 74A and a detector element 84 consisting of the semiconductor device 72B, the cathode 73B, and the anode 74B. A surface 237 lying opposite a lower end surface 12D of the detector element 83 and a surface 238 lying opposite a lower end surface 13D of the detector element 84 are formed at an upper end of the space 235. The level at which the surface 237 is located is lower than that at which the surface 238 is located. Further, the surfaces 237 and 238 are connected together by a vertical surface. An electrode contact member 17 with which the anode 74A contacts is provided on the vertical surface. The space 235 has a surface 239 formed lower than the surface 237. The surface 239 extends parallel to the surfaces 237 and 238 from the surface 237 to the surface 238. The surface 239 also extends from one inner surface of the space 235 to another inner surface lying opposite the one inner surface. An electrode contact member 16 having contact portions 16A, 16B, and 16C is provided in the space 235. The contact portion 16C is provided on the surface 239. The contact portion 16A is provided on the above one inner surface, while the contact portion 16B is provided on the above another inner surface. The contact portions 16A, 16B, and 16C are electrically connected together. The contact portions 16A, 16B, and 16C, constituting the electrode contact member 16, and the electrode contact member 17 are composed of a conductive material. The contact portions 16A, 16B, 16C and the electrode contact member 17 are formed at the corresponding positions using a three-dimensional injection circuit part manufacturing method (see HITACHI DENSEN No. 20, PP. 69 to 74 (2001-1)) of producing a circuit on resin by three-dimensional patterning based on metal plating or the like. Further, an insulation maintaining step portion 15 having a dimension D is formed inside the protective connector case 75 as shown in FIG. 6. Specifically, the insulation maintaining step portion 15D is formed between the surfaces 237 and 239. Thus, the electrode contact members 16 and 17 are spaced from each other via the insulation maintaining step portion 15D to prevent the electrode contact members 16 and 17 from being short-circuited.

The cathode pin 77 and the anode pin 76 are attached to the protective connector case 75 by being moldered integrally with the protective connector case 15. The cathode pin 77 has one end electrically connected to the electrode contact member 16 and the other end projecting from the protective connector case 15. Further, the anode pin 76 has one end electrically connected to the electrode contact member 17 and the other end projecting from the protective connector case 15. Moreover, the cathode pin 77 is formed like a crank, while the anode pin 76 is L-shaped. This prevents the pins 76 and 77 from slipping out of the protective connector case 75.

The semiconductor radiological detector 71 is inserted into and secured to the protective connector case 75 using a conductive paste, a conductive adhesive, or the like. In this state, the lower end surface 12D of the detector element 83 lies opposite the surface 237, while the lower end surface 13D of the detector element 84 lies opposite the surface 238. The cathodes 73A and 73B are electrically connected to the electrode contact member 16 in a surface contact manner. The anodes 74A and 74B are electrically connected to the electrode contact member 17 in a surface contact manner. Specifically, the cathode 73A contacts with the surface 16A of the electrode contact member 16, while the cathode 73B contacts with the surface 16B of the electrode contact member 16.

As shown in FIG. 4, the socket board 78 is provided with a plurality of pin holes 79 and 80 as hole portions which are used to apply voltages. Further, as shown in FIG. 7, X axis wires 81 are arranged on a bottom part of the socket board 78 so as to extend parallel to one another along the direction of the X axis. An end of the anode pin 77 is connected to each X axis wire 81. Y axis wires 82 are arranged on a bottom part of the socket board 78 so as to extend parallel to one another along the direction of the Y axis. An end of the cathode pin 76 is connected to each Y axis wire 82.

Figure 7:
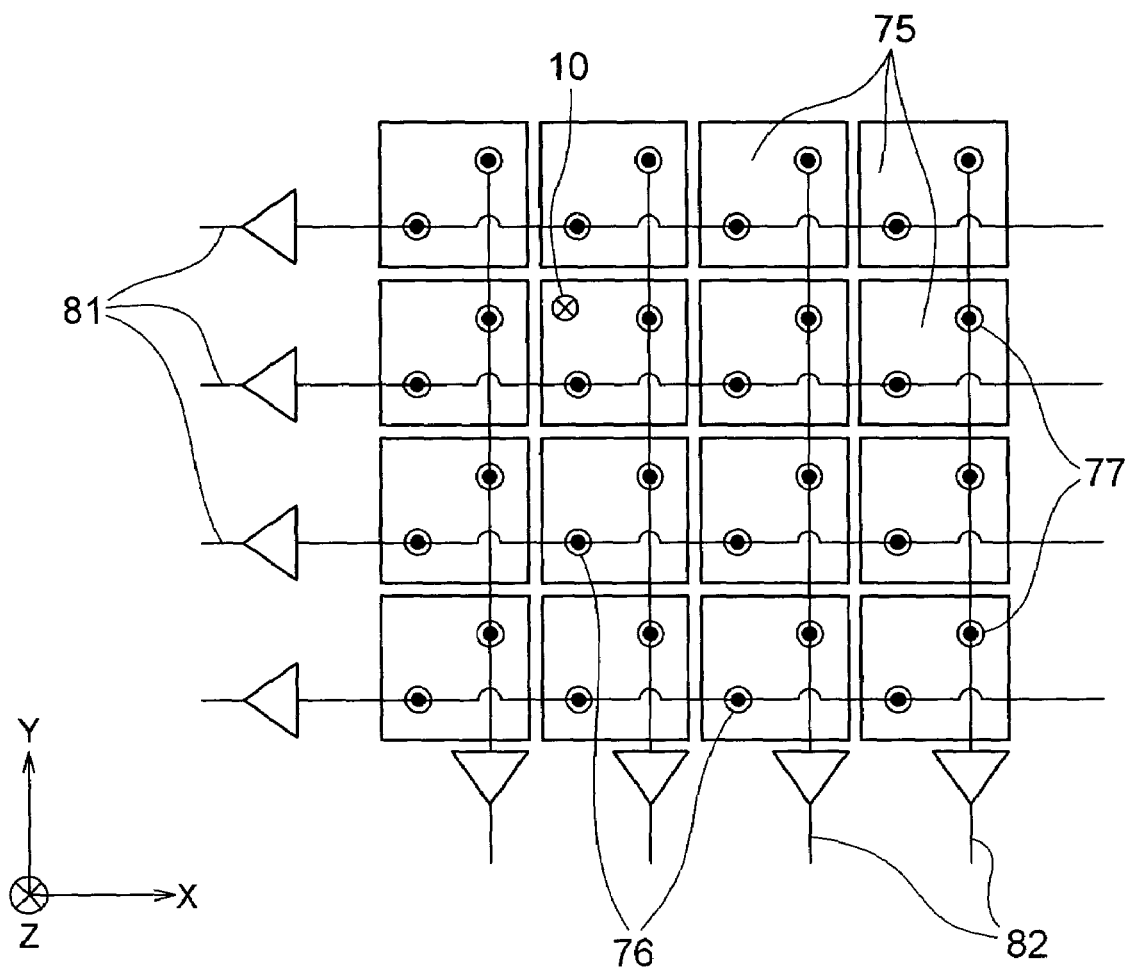
FIG. 7 is a top view showing a protective connector case in FIG. 4.

Thus, as shown in FIG. 7, if for example, the gamma rays 10 are incident to interact with the semiconductor devices 72A and 72B, information based on charges is obtained from the X axis wire 81 and Y axis wire 82 that are close to the position where the gamma rays 10 have interacted with the semiconductor devices 72A and 72B. In the example shown in FIG. 7, signals are obtained from the second X axis wire 82 from the top and from the second electrode from the left end of each Y axis wire 81. By superimposing these signals on each other, it is possible to detect where the gamma rays 10 have interacted with the semiconductor device 72, that is, where the gamma rays 10 have been incident in the semiconductor radiological detector 71. In this example, the detected position is the semiconductor radiological detector 71 that is the second from the top and second from the left end. That is, Y coordinate information is obtained from the wires parallel to the X axis. X coordinate information is obtained from the wires parallel to the Y axis.

In the present embodiment, configured as described above, the anode pin 77 and the cathode pin 76 can be extended straight downward from the bottom part of the protective connector case 75. This prevents a dead space for the signal lines from being created around the semiconductor radiological detector 71 as described in the prior art. Therefore, a number of semiconductor radiological detectors 71 can be densely installed to improve the detection sensitivity and spatial resolution of the semiconductor radiological detectors 71. When the semiconductor radiological detector 71 is replaced, the replacement can be easily accomplished simply by removing the anode pin 77 and the cathode pin 76 from the socket board 78. This improves the operability of the replacement.

Even for the detector that can be replaced by removing the pins, the number of circuits required is sharply reduced to 2/n compared to the case in which data is individually read from n×n pixels, by carrying out X and Y reading similar to that in the cross strip type detector.

Fourth Embodiment

Now, a fourth embodiment of the present invention will be described with reference to FIG. 8.

Figure 8:
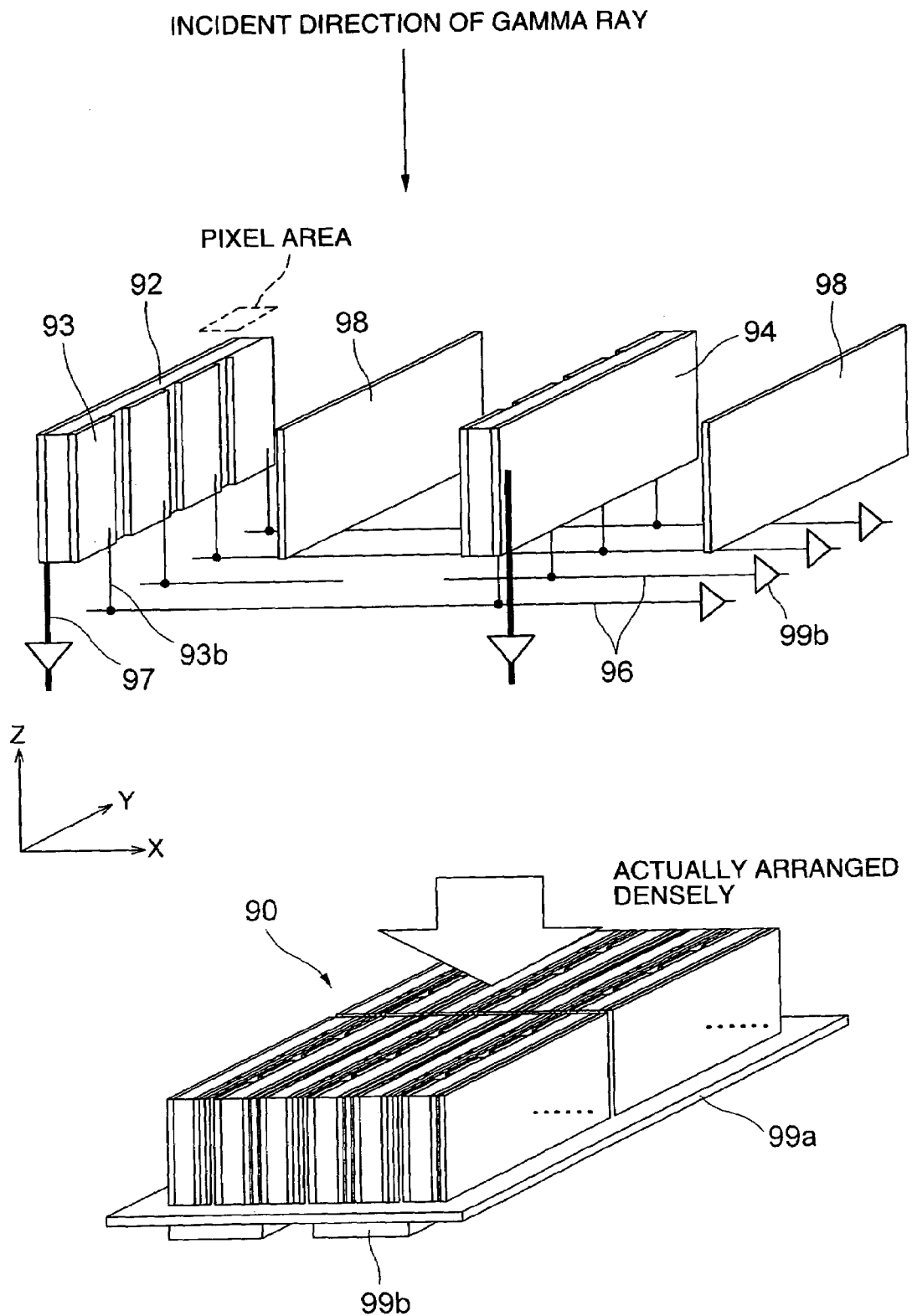
FIG. 8 is a perspective view showing a radiological detecting unit according to a fourth embodiment of the present invention.

In FIG. 8, a radiological detecting unit 90 comprises a plurality of planar semiconductor devices 92, 92, . . . The planar semiconductor element 92 has a cathode 94 formed all over one surface and elongate anodes 93, 93 formed on the other surface and extending parallel along the Z direction. The anodes 93, 93 are formed by dividing only the electrode of the semiconductor device 92 using photolithography or another technique. In contrast to the present embodiment, the anode may be formed all over a surface, with the cathode divided.

A signal read line 93b is connected to each anode 93 and extends straight from the anode 93 to the mounting substrate (in the direction of the Z axis). The signal read line 93b, connected to the anode 93, is connected to a corresponding one of a number of X axis wires 96 extending parallel to one another along the direction of the X axis. The signal read lines 93b connected to the anodes 93 with the same Y coordinate are connected to the same X axis wire 96. Between the semiconductor devices 92 and 92, an insulating plate 98, 98 is sandwiched between the anodes to enable the insulation between the signal lines to be maintained. Since the anodes are located opposite each other, the insulating plate 98 may be thin.

Further, each cathode 94 itself may be considered to be a Y axis wire 97. Using the Y axis signal read line 97, extending straight in the direction of the Z axis, the cathode 94 is connected to a read circuit 99b mounted on the mounting substrate 99a. Between the semiconductor devices 92 and 92, an insulating plate 98, 98 is sandwiched between the cathodes to enable the insulation between the signal lines to be maintained. Since the cathodes are located opposite each other, the insulating plate 98 may be thin.

Also in the present embodiment, configured as described above, the signal read line, the X axis wire 96, and the Y axis wire 97 can be extended straight line from the cathode 94 and the anode 93, respectively, toward the mounting substrate. Therefore, a number of semiconductor radiological detectors 91 can be densely installed to improve the detection sensitivity and spatial resolution of the semiconductor radiological detectors 91. Further, the cross strip type reading method can be used to sharply reduce the number of circuits.

Fifth Embodiment

Now, a fifth embodiment of the present invention will be described with reference to FIG. 9.

Figure 9:
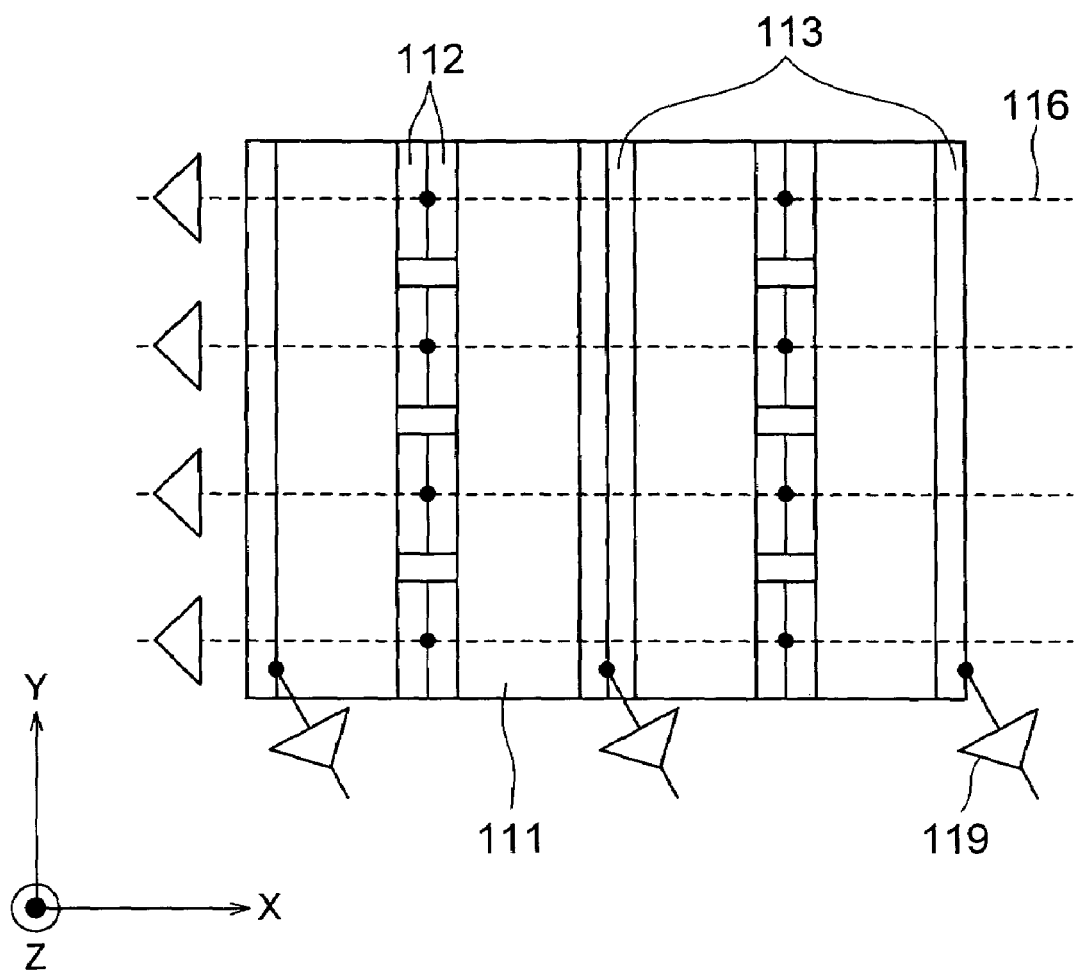
FIG. 9 is a top view showing a radiological detecting unit according to a fifth embodiment of the present invention.
Figure 10:
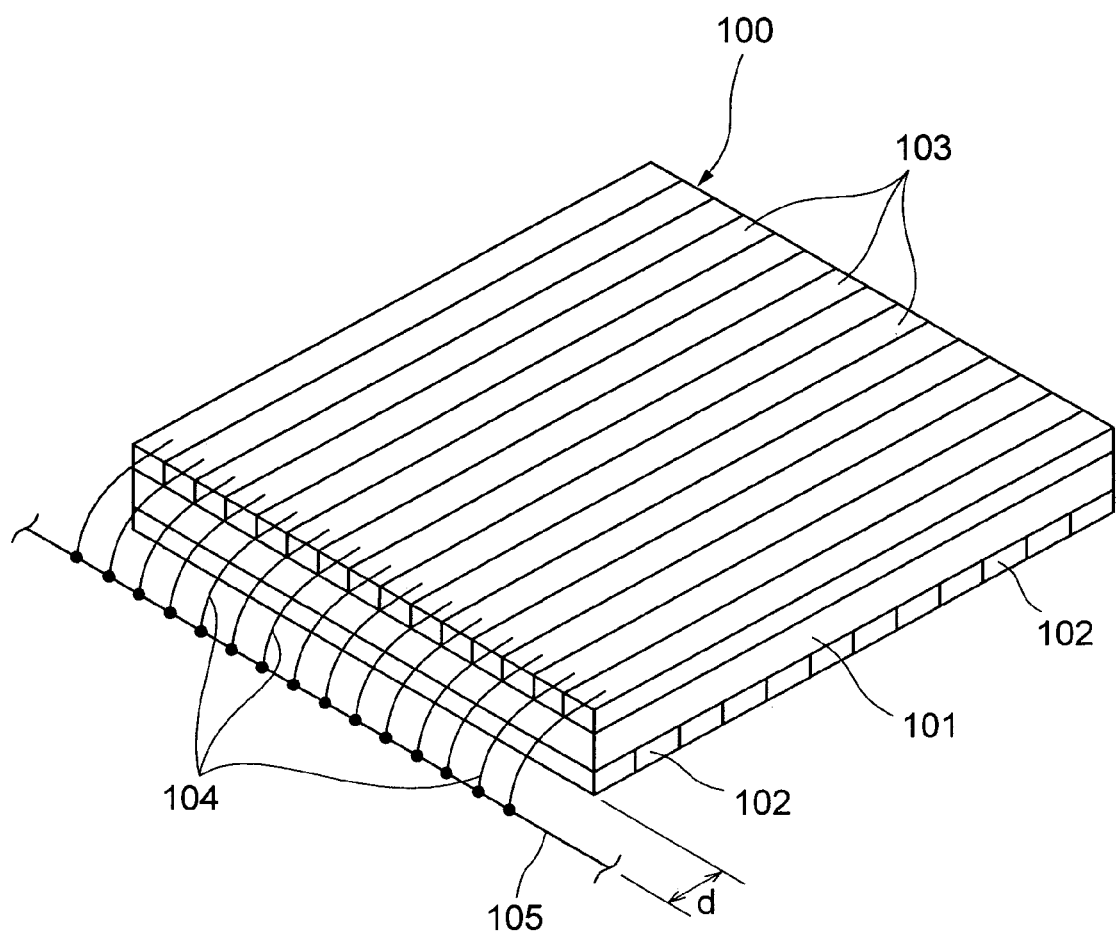
FIG. 10 is a perspective view showing a cross strip type radiological detector according to the prior art.

In FIG. 9, a semiconductor device 111 is composed of a cathode 113 formed on one surface of the semiconductor device 111 and an elongate anode 112 placed opposite the cathode 113 via the semiconductor device 111 and extending parallel to the direction of the Z axis. The anode 112 of the semiconductor device 111 is connected to the anode 112 of the opposite semiconductor device 111. The cathode 113 is connected to the cathode of the opposite semiconductor device 111.

A signal read line (not shown) is provided on each anode 112 and extends straight from the anode 112 in the direction of the Z axis. The signal line is connected to a corresponding one of a number of X axis wires 116 extending parallel to one another in the direction of the X axis. Further, the anodes 113 present at the same Y coordinate are connected to the same X axis wire 116. The cathodes constitute Y axis wires as they are and are connected to a reading circuit 119 using signal read lines extending straight in the direction of the Z axis.

This structure increases the range of read pixels so as to cover two semiconductor devices 111. However, since the structure avoids sandwiching an insulating plate between the electrodes, the occupation of a unit area by the semiconductor devices increases to provide a detector structure with a high sensitivity.

Also in the present embodiment, configured as described above, the signal lines can be extended straight from the anode 113 and the cathode 112, respectively. Therefore, a number of semiconductor radiological detectors 110 can be densely installed to improve the detection sensitivity and spatial resolution of the semiconductor radiological detectors 110. Further, the cross strip type reading method can be used to sharply reduce the number of circuits.

In the embodiments, description has been given of the example in which the semiconductor radiological detector is applied to a SPECT apparatus. However, the present invention is not limited to this aspect. The semiconductor radiological detector may be applied to a PET.

Further, the semiconductor radiological detector includes not only Si, Ge, or CdTe, which is commonly used, but also a combination of a scintillator with a photodiode or an avalanche photodiode.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A semiconductor radiological detector comprising a semiconductor device, an anode attached to one surface of the semiconductor device, a cathode attached to the other surface of the semiconductor device, a first signal line one end of which is connected to the anode and the other end of which extends straight from the anode to a substrate perpendicularly to output a signal from the anode, and a second signal line which is connected to the cathode and the other end of which extends straight from the cathode to the substrate perpendicularly to output a signal from the cathode.

2. The semiconductor radiological detector according to claim 1, wherein the one end of the first signal line is connected to each of a plurality of the anodes, while the other end of the first signal line is connected to an X axis wire extending in a direction of an X axis, and one end of the second signal line is connected to each of a plurality of the cathodes, while the other end of the second signal line is connected to a Y axis wire extending in a direction of a Y axis.

3. A semiconductor radiological imaging apparatus including the semiconductor radiological detector according to claim 2.

4. A single photon emission CT apparatus including the semiconductor radiological detector according to claim 2.

5. A positron emission tomography apparatus including the semiconductor radiological detector according to claim 2.

6. The semiconductor radiological detector according to claim 1 wherein the anodes or cathodes of at least two semiconductor devices are abutted against each other.

7. The semiconductor radiological detector according to claim 2 wherein the anodes or cathodes of at least two semiconductor devices are abutted against each other.

8. A semiconductor radiological imaging apparatus including the semiconductor radiological detector according to claim 7.

9. A single photon emission CT apparatus including the semiconductor radiological detector according to claim 7.

10. A positron emission tomography apparatus including the semiconductor radiological detector according to claim 7.

11. A semiconductor radiological imaging apparatus including the semiconductor radiological detector according to claim 6.

12. A single photon emission CT apparatus including the semiconductor radiological detector according to claim 6.

13. A positron emission tomography apparatus including the semiconductor radiological detector according to claim 6.

14. A semiconductor radiological imaging apparatus including the semiconductor radiological detector according to claim 1.

15. A single photon emission CT apparatus including the semiconductor radiological detector according to claim 1.

16. A positron emission tomography apparatus including the semiconductor radiological detector according to claim 1.

* * * * *